United States Patent
Tompkin et al.

(10) Patent No.: US 8,238,027 B2
(45) Date of Patent: Aug. 7, 2012

(54) SECURITY ELEMENT PROVIDED IN THE FORM OF A MULTILAYERED FILM BODY

(75) Inventors: Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 953 days.

(21) Appl. No.: 10/599,620

(22) PCT Filed: Mar. 31, 2005

(86) PCT No.: PCT/EP2005/003405
§ 371 (c)(1), (2), (4) Date: May 16, 2007

(87) PCT Pub. No.: WO2005/095119
PCT Pub. Date: Oct. 13, 2005

(65) Prior Publication Data
US 2007/0273142 A1    Nov. 29, 2007

(30) Foreign Application Priority Data
Apr. 3, 2004 (DE) .......................... 10 2004 016 596

(51) Int. Cl.
*G02B 5/18* (2006.01)

(52) U.S. Cl. .......................... 359/569; 359/573; 359/575

(58) Field of Classification Search .................. 359/569, 359/573–575
See application file for complete search history.

(56) References Cited

U.S. PATENT DOCUMENTS

| 5,087,507 A | 2/1992 | Heinzer |
| 5,907,436 A | 5/1999 | Perry et al. |
| 6,006,415 A * | 12/1999 | Schaefer et al. ............. 29/527.1 |
| 6,036,233 A | 3/2000 | Braun et al. |
| 2003/0058491 A1 * | 3/2003 | Holmes et al. ..................... 359/2 |
| 2003/0104206 A1 | 6/2003 | Argoitia et al. |
| 2003/0190473 A1 | 10/2003 | Argoitia et al. |

FOREIGN PATENT DOCUMENTS

| DE | 4132476 A1 | 4/1993 |
| DE | 4242407 A1 | 9/1993 |

(Continued)

OTHER PUBLICATIONS

"Optical document security", Second Edition., Chapter 13, pp. 289-329, R.L. van Renesse, Artech House, London, 1998.

(Continued)

*Primary Examiner* — Jade R Chwasz
(74) *Attorney, Agent, or Firm* — Hoffman & Baron, LLP

(57) ABSTRACT

A security element in the form of a multi-layer film body with a security element and a process for the production of such a security element. The film body has a replication lacquer layer and a thin-film layer for producing a viewing angle-dependent color shift effect by interference. A first relief structure is shaped in a first region in the interface between the replication lacquer layer and the thin-film layer. That relief structure suppresses the production of the color shift effect by the thin-film layer so that the color shift effect is not present in the first region in which the first relief structure is provided and the color shift effect produced by the thin-film layer is present in a second region of the security element, in which the first relief structure is not provided.

20 Claims, 9 Drawing Sheets

FOREIGN PATENT DOCUMENTS

| | | |
|---|---|---|
| DE | 10216563 A1 | 10/2003 |
| EP | 0420261 A2 | 4/1991 |
| EP | 0657297 B1 | 6/1995 |
| EP | 0756945 A1 | 2/1997 |
| EP | 0733230 B1 | 4/1998 |
| EP | 0678400 B1 | 5/2000 |
| EP | 1189079 A1 | 3/2002 |
| EP | 1342565 A1 | 9/2003 |
| EP | 1198357 B1 | 12/2005 |
| RU | 2161092 | 12/2000 |
| WO | WO 95/16224 | 6/1995 |
| WO | WO0103945 A1 | 1/2001 |
| WO | WO0200445 A1 | 1/2002 |
| WO | WO03/033274 A1 | 4/2003 |
| WO | WO03/084765 A2 | 10/2003 |
| WO | WO03/095228 A1 | 11/2003 |
| WO | WO03095657 A2 | 11/2003 |
| WO | WO2004024836 A2 | 3/2004 |

OTHER PUBLICATIONS

Taiwanese Office Action mailed Oct. 25, 2010 issued in Taiwanese Patent Application No. 94110442.

Opposition Proceedings filed on Dec. 16, 2011 in European Application/Patent No. 05735248.6/EP 1747100.

* cited by examiner

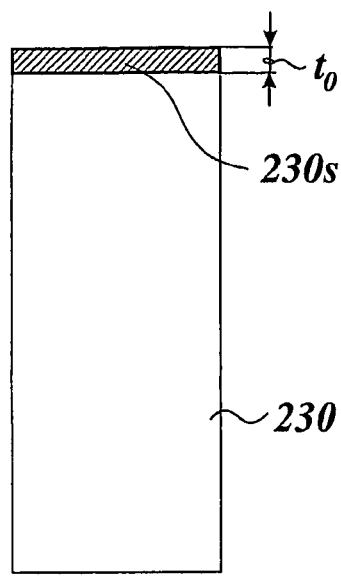
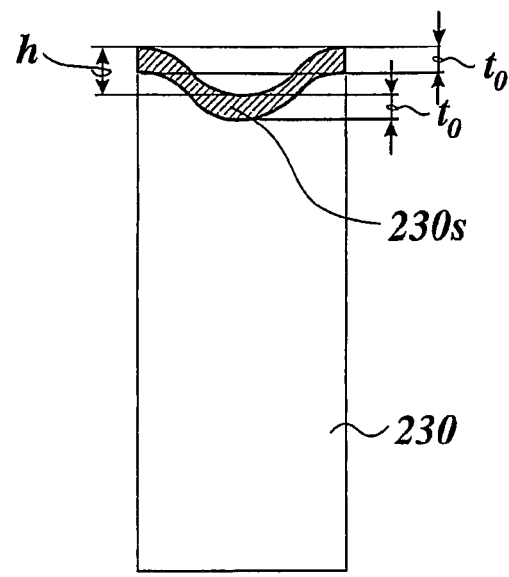
*Fig. 5a*  *Fig. 5b*
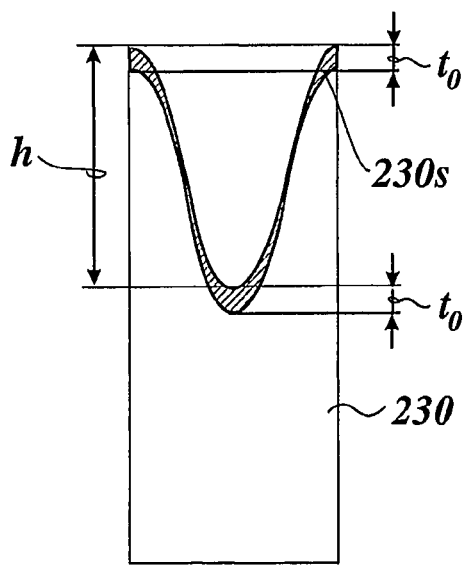
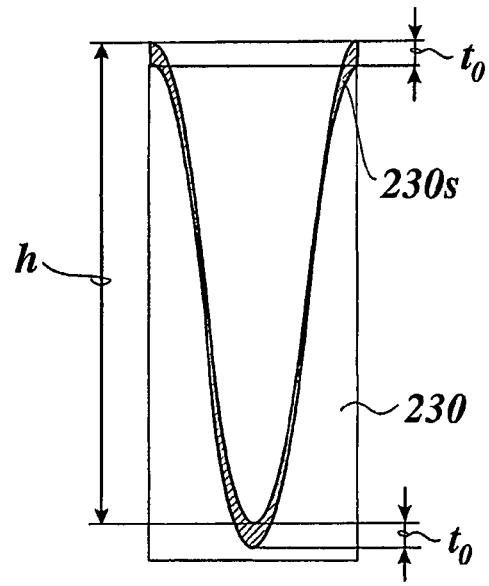
*Fig. 5c*  *Fig. 5d*

SECURITY ELEMENT PROVIDED IN THE FORM OF A MULTILAYERED FILM BODY

This application claims priority based on an International Application filed under the Patent Cooperation Treaty, PCT/EP2005/003405, filed on Mar. 31, 2005 and German Application No. 102004016596.3-45, filed on Apr. 3, 2004.

BACKGROUND OF THE INVENTION

The invention concerns a security element in the form of a multi-layer film body which has a replication lacquer layer and a thin-film layer for producing a viewing angle-dependent colour shift effect by means of interference and in which a relief structure is shaped in the interface between the replication lacquer layer and the thin-film layer. The invention further concerns a security document having such a security element and a process for the production of such a security element.

Optically variable security elements are frequently used to impede and if possible prevent copying and misuse of documents or products. Thus optically variable security elements are frequently used for safeguarding documents, banknotes, credit cards, cash cards and the like. In that respect it is known for an optically variable element to be provided with a thin film which produces viewing angle-dependent colour shift effects by means of interference.

By way of example WO 01/03945 A1 describes a security product having a transparent substrate, to one side of which is applied a thin film which produces a perceptible colour shift in dependence on the viewing angle of the person viewing it. In that case the thin film comprises an absorption layer which is applied to the transparent substrate and a dielectric layer which is applied to the absorption layer. The absorption layer includes a material which is made up from one of the following materials or a combination of those materials: chromium, nickel, palladium, titanium, cobalt, iron, tungsten, molybdenum, iron oxide or carbon. The dielectric layer comprises one of the following materials or a combination of the following materials: silicon oxide, aluminium oxide, magnesium fluoride, aluminium fluoride, barium fluoride, calcium fluoride or lithium fluoride.

A diffraction pattern is applied on the opposite side of the transparent substrate in order further to increase the level of security against copying. That diffraction pattern acts as a diffraction grating so that for example the illusion of a three-dimensional image can be produced for the viewing person, by means of that two-dimensional pattern.

It is further proposed that the diffractive pattern is embossed on the side of the transparent substrate to which the thin film is also applied.

Those two configurations of an optically variable security element provide that the optical effects produced by the thin film layer and the optical effects produced by the diffractive pattern are superimposed at each location of the optically variable element and that therefore gives overall an optical effect which is composed of those two effects, that is to say for example the superimposition of a colour shift effect and a hologram.

In addition WO 02/00445 A1 describes an optically variable security element which comprises a plurality of mutually superposed layers and which has a thin film which produces the optical effect, as already described hereinbefore, of a viewing angle-dependent colour change. The optically variable security element further has a replication layer into which a relief structure is embossed. That relief structure produces a further optical effect, namely the diffraction effect which has already been described hereinbefore, by means of which holograms and the like can be displayed. In that respect, in terms of production procedure, firstly the thin film layer is applied to the replication layer and then the relief structure is applied by embossing.

In this connection, two procedures are proposed for decoupling the optical effects produced by the thin film and the relief structure: on the one hand it is proposed that an opaque layer is applied between the relief structure which produces a holographic image by means of diffraction and the thin film which produces a colour change. The relief structure is screened from the thin-film structure by means of that opaque layer. The second possibility involves arranging two or more layers of a substantially transparent medium between the relief structure which produces a holographic image by diffraction, and the thin film. Those layers can include one or more high-refractive layers and an adhesive layer. Reflection and thus the strength of the light in the region of the relief structure producing a holographic image are increased by means of those layers and the holographic image therefore stands out in relation to the colour shift effect of the thin film.

SUMMARY OF THE INVENTION

Now the object of the invention is to improve the production of an optically variable security element which has a thin film for producing a viewing angle-dependent colour shift effect by means of interference and to provide an improved optical security element having a thin-film layer of that kind.

The object of the invention is attained by a security element in the form of a multi-layer film body, which has a replication lacquer layer and a thin-film layer for producing a viewing angle-dependent colour shift effect by means of interference and in which a first relief structure is shaped in an interface between the replication lacquer layer and the thin-film layer in a first region of the security element, wherein the first relief structure is adapted to suppress the production of the colour shift effect by the thin-film layer so that in the first region of the security element in which the first relief structure is provided the colour shift effect is not present and in a second region of the security element in which the first relief structure is not provided the colour shift effect produced by the thin-film layer is present. The object of the invention is further attained by a process for the production of a security element in the form of a multi-layer film body, in which a first relief structure is shaped in a replication lacquer layer of the multi-layer film body in a first region of the security element and in addition a thin-film layer is applied to the replication lacquer layer for producing a viewing angle-dependent colour shift effect by means of interference, wherein shaped as the first relief structure in the first region of the security element is a relief structure which suppresses the production of a colour shift effect by the thin-film layer so that no colour shift effect is present in the first region of the security element in which the first relief structure is provided and a colour shift effect produced by the thin-film layer is present in a second region of the security element in which the first relief structure is not provided. The object of the invention is further attained by a process for the production of a security element in the form of a multi-layer film body, in which a first relief structure is shaped in a replication lacquer layer of the multi-layer film body in a first region of the security element and in addition a thin-film layer is applied to the replication lacquer layer for producing a viewing angle-dependent colour shift effect by means of interference, and in which shaped as the first relief structure in the first region of the security element is a relief structure which alters the colour shift effect produced by the thin-film layer so that a first colour shift effect is produced by the thin-film layer in the first region of the security element in which the first relief structure is provided and a second colour shift effect which differs from the first colour shift effect is produced by the thin-film layer in a second region of the security element in which the first relief structure is not provided.

Thin-film layers are distinguished in principle by an interference layer structure (fulfilment of the $\lambda/2$ or $\lambda/4$ condition) which produces viewing angle-dependent colour shifts. In that respect the thin-film layer can be in the form of a reflective element or a transmissive element. In that respect a thin-film layer can in principle comprise a single layer with a very high refractive index ($\lambda/2$ or $\lambda/4$ layer), three or more dielectric layers with alternately high and low refractive indices or two or more alternate metallic and dielectric layers. Thus for example the thin-film layer has a metallic absorption layer (preferably with between 30% and 65% transmission), a transparent spacer layer as a colour change-producing layer ($\lambda/2$ or $\lambda/4$ layer), a metal layer as a reflecting layer (reflective element) or an optical separating layer (transmissive element).

Strictly speaking in that respect the $\lambda/2$ or $\lambda/4$ condition assumes that $\lambda$ is the wavelength in the thin film so that the refractive index of the thin film is also considerable, for fulfilling that condition. In the case of reflection ($\lambda/4$ condition), constructive interference of the light occurs at a thin-film layer for perpendicularly incident light if the thickness of the thin-film layer is $\frac{1}{4}, \frac{3}{4}, \ldots$ of the wavelength $\lambda$ of the light in the thin film, in general terms if $$t = \frac{\left(m + \frac{1}{2}\right)\lambda_0}{2n} = \frac{\left(m + \frac{1}{2}\right)\lambda}{2} \quad m = 0, 1, 2 \ldots$$

Therein $\lambda_0$ is the wavelength in air and $\lambda$ is the wavelength in the thin film which has a refractive index n.

Furthermore in that respect it is also possible for the refractive index of a thin film not to be constant but also to be more complex (for example wavelength-dependent) and for intermediate layers to have suitable inherent colours which do not change in dependence on viewing angle and which can superimpose the colour shift effect generated by interference.

The following applies for tight incidence which is not perpendicular to the plane of the thin film:

$$t = \frac{\lambda_0}{2n\cos\theta}$$

wherein $\theta$ is the angle of incidence of the light. With a suitable choice in respect of the thickness of the thin film, that affords the viewing angle-dependent colour shift effect which has already been referred to hereinbefore.

In that respect the invention is based on the notion that, by means of shaping a suitable relief structure in the interface between a replication lacquer layer and the thin-film layer, production of the colour shift effect by the thin-film layer in the region of that relief structure is suppressed and that therefore provides a highly inexpensive, environmentally friendly and precise possible way of structuring the colour shift effect in pattern form.

The invention on the one hand reduces the cost of the production of security elements in which the colour shift effect produced by the thin-film layer is to be provided not over the full surface area involved but only in a pattern region or in a background region. The invention saves on cost-intensive and environmentally harmful process steps, in the production of security elements of that kind. Thus for example the printing, etching and strip processes which are necessary for partial shaping of the thin-film layer are eliminated.

It has further been found that very high levels of resolution can be achieved by means of the invention and it is thus possible to implement pattern regions involving very fine contours. The process according to the invention makes it possible to achieve levels of resolution which are better by a factor of 1000 than the levels of resolution which can be achieved by other processes (for example with a width for the structural elements of the first relief structure, which is in the region of the wavelength but also below the wavelength of visible light). In that respect also major advantages are achieved over the processes which were used hitherto and it is possible with the invention to produce security elements with a higher level of safeguard against copying and forgery.

Advantageous configurations of the invention are set forth in the appendant claims.

It has been found that relief structures which suppress the production of a colour shift effect by the thin-film layer are distinguished by a high depth-to-width ratio of the individual structural elements of the relief structure.

Relief structures of that kind have a substantially higher effective surface area than usual relief structures which are shaped for producing optical effects in security elements. In that way—in accordance with a simplified explanatory model—the effective thickness of the thin-film layer and therewith also the effective thickness of the spacer layer of the thin-film layer, which produces the colour change, are considerably reduced so that the spacer layer, due to the relief structure, no longer fulfils the $\lambda/2$ or $\lambda/4$ condition. Thus a different colour shift effect occurs in the region of that relief structure—or with a correspondingly great reduction in the effective thickness of the spacer layer—there is no longer any colour shift effect, that is to say no longer any colour shift effect which is visible to the viewer. The viewer perceives a different colour shift effect or no viewing angle-dependent colour shift effect, in the region of the relief structure. Accordingly, by virtue of the reduction in the effective thickness of the spacer layer producing the colour change by the relief structure, the colour shift effect produced by the thin film is suppressed by the relief structure.

What is essential for the occurrence of that effect is a high mean depth-to-width ratio of the individual structural elements of the relief structure, which should be greater than 0.5, as well as a correspondingly small spacing in respect of the structural elements, which should be less than 200 µm, preferably les than 10 µm (diffractive relief structure). In that respect, the specific choice of the depth-to-width ratio is dependent on the specific relief structure and the thin-film layer, substantially on the thickness of the spacer layer or layers producing the colour change, and can be determined experimentally or analytically, as is shown hereinafter by means of a number of embodiment by way of example.

Investigations have revealed that, from a depth-to-width ratio of 1, there is a quite great reduction in the effective layer thickness and diffractive relief structures with a depth-to-width ratio in the range of between 1 and 10 are particularly suitable for ensuring that a colour shift effect is no longer produced in the region of the first relief structure.

As already stated hereinbefore, those relief structures can be used not only to provide that a colour shift effect is no longer produced by the thin-film layer in the region of the relief structure, but they can also be used to provide that, in the region of the relief structure, a colour shift effect is produced which is different from that which is predetermined by the structural parameters of the relief structure (thickness of the spacer layer). It is also possible in that way to provide that the optical impression in the first region differs markedly from the optical impression in the second region in which that relief structure is not provided. Thus for example in the first region it is found that there is a viewing angle-dependent colour shift effect from green to blue while in the second region there is a viewing angle-dependent colour shift effect from red to green.

In that respect this effect can also be utilised to produce a kind of true-colour image by suitable structuring by a procedure whereby the aspect ratio (depth-to-width ratio of the structural elements) is varied locally so that the colour is set locally for each pixel of the true-colour image, by virtue of the selection of the aspect ratio. It is thus possible for example for the depth of the relief structure to be varied, with a constant grating frequency, in accordance with the colour to be provided for the respective pixel.

In accordance with a preferred embodiment of the invention the first or the second region forms a pattern region in the form of a logo, a text or an image and the respective other one of the two regions forms a background region so that the pattern region stands out clearly by virtue of the differing action of the First and second regions. In that respect a second relief structure is preferably shaped in the interface in the second region so that, in the second region, the optical effect generated by the second relief structure is superimposed with the optical effect generated by the thin-film layer.

It is further possible for example for a fine line pattern, for example a guilloche pattern, to extend over the first and second regions. The particular advantage of using the present invention in this respect is that this fine line pattern can be particularly filigree and can be in register relationship with all diffractive security features. By way of example the pattern region is of V-shaped form, wherein the background region presents a colour change effect and the V-shaped region does not present any such colour change effect. In addition a guilloche pattern extends over the pattern region and the background region. A relief structure with a high depth-to-width ratio is shaped in the V-shaped pattern region. A relief structure with a low depth-to-width ratio, preferably with a depth-to-width ratio of less than 0.2, is used to form the lines of the guilloche pattern which extend both over the pattern and also over the background region.

The second relief structure is here preferably formed by a structure having an optical-diffraction effect, for example a hologram or a KINEGRAM®. It is however also possible for the relief structure used to be a macrostructure or a matt structure which generate corresponding optically variable effects.

It is here possible by virtue of use of the invention for regions in which a viewing angle-dependent colour shift effect is generated by the thin-film layer and regions in which a further optically variable effect is produced by a preferably diffractive structure to be arranged in mutually superposed register relationship and thereby for a security feature to be generated, in which the two above-mentioned optical effects are superimposed in accurate register relationship. Such a security feature can be imitated only with very great difficult by virtue of the application of a partial thin-film layer to a replication layer provided with a diffractive structure, as applying or removing a thin-film layer, in register relationship, which is geared to the diffractive structure, imposes very high technological demands.

In accordance with a further preferred embodiment of the invention, a continuous progression can be produced for the viewer from a region in which a strong colour shift effect is visible to the viewer to a region in which a colour shift effect is no longer visible to the viewer. For that purpose, the strength of the local colour shift effect is determined by a local "grey value" in the manner of a grey scale image. In that respect the local "grey value" is determined by the local proportion of the surface area involved in respect of the first relief structure. Thus, "colour shift images" can be generated by means of the invention, by virtue of the high levels of resolution which can be achieved by means of the invention. The generation of such "colour shift images" by means of partial application of the thin-film layer is in contrast thereto possible only with a very great deal of difficulty and with a very high level of technological complication and effort.

In that respect the "grey shade" of a "colour shift image," is preferably determined by the ratio of first raster regions in which the first relief structure is shaped and second raster regions in which the first relief structure is not shaped. In that respect the dimensioning of the individual raster regions is preferably less than 300 µm, preferably about 50 µm.

It is possible in that respect for the thin-film layer to be in the form of a transmissive thin-film layer or a reflective thin-film layer and for the thin-film layer to be made up of a plurality of dielectric layers, a plurality of dielectric and metallic layers or a pearlescence layer. It is further possible for a partial reflection layer to be arranged between the replication lacquer layer and the thin-film layer, thereby to produce regions in which for example only a reflective optical-diffraction effect is visible. It is also possible to apply a partial reflective layer to a thin-film layer which is transparent over its entire surface area, in order thereby to provide a security element having transmissive and reflective regions By virtue of those variants or a combination thereof it is possible to implement complex and optically attractive security elements based on the underlying notion of the invention.

Preferably a diffractive structure with a high depth-to-width ratio of the individual structural elements of the relief structure is used as the relief structure which is adapted to suppress or produce a colour shift effect by the thin-film layer. In that respect it has been found that good results can be achieved in particular with a depth-to-width ratio of between 0.75 and 5. Depth-to-width ratios with a factor of 10 are also possible.

In accordance with a further preferred embodiment of the invention the relief structure which is adapted to suppress or produce a colour shift effect by the thin-film layer is a relief structure in which the depth of the relief structure is varied both in the x-direction and also in the y-direction, in which the mean spacing of adjacent raised portions of the relief structure is smaller than the mean profile depth of the relief structure and in which adjacent raised portions of the relief structure are less than 200 µm away from each other and are thus below the resolution capability of the human eye. Structures of that kind can also involve structures with a stochastic surface profile which fulfil the foregoing conditions. Structures of that kind can be particularly well embodied by means of a UV replication process.

Preferably however relief structures are used as such relief structures, which are a periodic function of the co-ordinates x and y, in which the depth of the relief structure is periodically varied both in the x-direction and also in the y-direction and in which the period length in the x-direction and in the y-direction is less than or equal to the structural depth of the relief structure. An advantageous embodiment of such a relief structure comprises a cross-grating which is composed to two base gratings arranged in substantially right-angled relationship with each other, and in which the period length of the base gratings is less than or equal to the structural depth of the first relief structure.

Particularly good results can be achieved with the above-described relief structures if the mean spacing of adjacent raised portions or at least one of the period lengths is shorter than the limit wavelength of visible light.

It has further been found that particularly good results can be achieved when the thin-film layer is applied to the replication lacquer layer by means of sputtering or vapour deposition after the operation of shaping the above-described relief structures. In that case the thin-film layer is applied in the first region and in the second region in the same manner and thus with the same nominal density in relation to surface area.

A security element according to the invention is preferably used for safeguarding banknotes, credit cards, cash cards, documents or articles. In that respect the security element is preferably formed by a multi-layer film body which forms a transfer film, in particular a hot stamping film, or a laminating film.

BRIEF DESCRIPTION OF THE DRAWINGS

The invention is described by way of example hereinafter by means of a number of embodiments with reference to the accompanying drawings in which.

FIGS. 5a to 5d show diagrammatic sectional views of relief structures with different depth-to-width ratios.

DETAILED DESCRIPTION OF THE INVENTION

Figure 1:
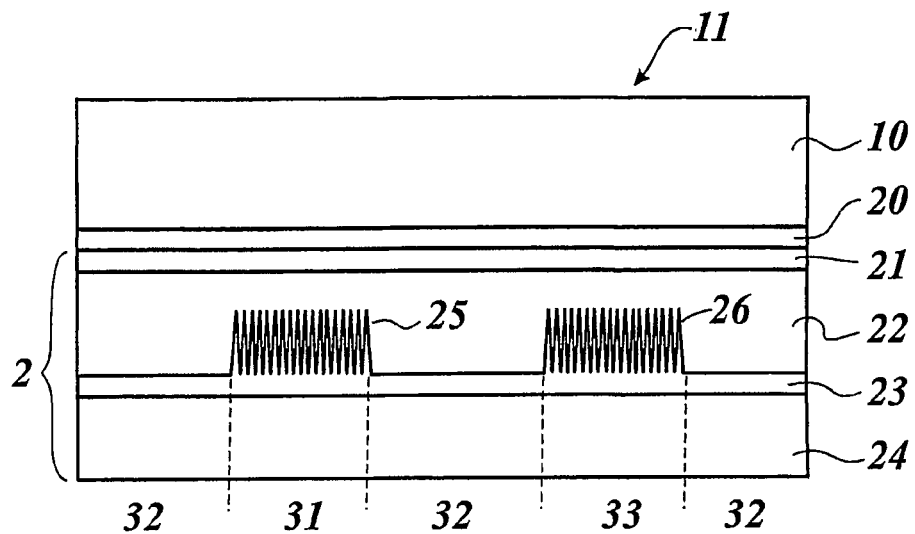
FIG. 1 shows a diagrammatic view of a security element according to the invention.

FIG. 1 shows a security element 11 in the form of a multi-layer film body which has a carrier film 10, a release layer 20, a protective lacquer layer 21, a replication lacquer layer 22, a thin-film layer 23 and an adhesive layer 24.

The security element 11 is a stamping film in particular a hot stamping film. It is however also possible for the security element 11 to be in the form of a laminating film or a sticker film.

The carrier layer 10 comprises for example a PET or POPP film of a layer thickness of between 10 μm and 50 μm, preferably of a thickness of between 19 μm and 23 μm. The release layer 20 and the protective lacquer layer 21 are then applied to the carrier film by means of an intaglio raster roller. The release and protective lacquer layers 20 and 21 in that case are preferably of a thickness of between 0.2 and 1.2 μm. It would also be possible to dispense with those layers.

The replication lacquer layer 22 is then applied.

The replication lacquer layer 22 preferably comprises a radiation cross-linkable replication lacquer. Preferably a UV replication process is used for shaping the relief structures 25 and 26 in the replication lacquer layer 22. In that case a UV-hardenable lacquer is used as the replication lacquer. In that respect the operation of producing the relief structures 25 and 26 in the UV-cross-linkable replication lacquer layer is effected for example by UV irradiation in the operation of shaping the relief structure in the lacquer layer while it is still soft or fluid or by partial irradiation and hardening of the UV-cross-linkable lacquer layer. In that case instead of a UV-cross-linkable lacquer it is also possible to use another radiation cross-linkable lacquer.

It is possible for the replication lacquer layer 22 to comprise a transparent thermoplastic material. One or more relief structures, for example the relief structures 25 and 26, are then embossed in the replication lacquer layer 22 by means of a stamping tool.

The thickness which is to be adopted for the replication lacquer layer 22 is determined by the profile depth adopted for the relief structures 25 and 26. It is necessary to ensure that the replication lacquer layer 22 is of a sufficient thickness to permit the relief structures 25 and 26 to be formed. Preferably in that respect the replication lacquer layer 22 is of thickness of between 0.3 and 1.2 μm.

By way of example the replication lacquer layer 22 is applied to the protective lacquer layer 21 over the full surface area involved by means of a line raster intaglio printing cylinder with an application weight of 2.2 g/m² prior to drying. In that respect a lacquer of the following composition is selected as the replication lacquer:

| Component | Proportion by weight |
|---|---|
| High-molecular PMMA resin | 2000 |
| Silicone alkyd oil-free | 300 |
| Non-ionic wetting agent | 50 |
| Low-viscosity nitrocellulose | 12000 |
| Toluene | 2000 |
| Diacetone alcohol | 2500 |

The replication lacquer layer 22 is then dried in a drying passage at a temperature of between 100 and 120° C.

Then the relief structures 25 and 26 are embossed into the replication lacquer layer 22 for example by means of a female die consisting of nickel, at about 130° C. The die is preferably heated electrically for embossing the relief structures 25 and 26 in the replication lacquer layer. Before the die is lifted off the replication lacquer layer 22 after the embossing operation the die can be cooled down again in that case. After the relief structures 25 and 26 have been embossed in the replication lacquer layer the replication lacquer of the replication lacquer layer 22 hardens by cross-linking or in some other fashion.

In addition it is also possible for the relief structures 25 and 26 to be produced in the replication lacquer 22 by an ablation process.

In that respect the relief structures 25 and 26 involve relief structures 25 and 26 which suppress the production of a colour shift effect by the thin-film layer 23.

Structures which present that effect have a high depth-to-width ratio in the individual structural elements of the relief structure and thus an effective surface area which is multiple higher than usual relief structures which are shaped in security elements for the production of optical effects.

In that way—in accordance with a simplified explanatory model—the effective thickness of the thin-film layer and therewith also the effective thickness of the spacer layer, which produces the colour change, of the thin-film layer is considerably reduced so that a different colour shift effect—or with a correspondingly great reduction in the effective thickness of the spacer layer—no colour shift effect at all occurs as the spacer layer no longer satisfies the $\lambda/2$ or $\lambda/4$ condition, due to the relief structure. In other words, in the region of the relief structure, the viewer perceives a different colour shift effect or no longer perceives any viewing angle-dependent colour shift effect. In that way, the colour shift effect produced by the thin film is suppressed by the relief structure by virtue of the reduction in the effective local thickness of the spacer layer producing the colour change, by the relief structure.

What is essential for the occurrence of that effect is a high mean depth-to-width ratio of the individual structural elements of the relief structure, which should be greater than 0.5, as well as a correspondingly small spacing of the structural elements, which should be less than 200 μm, preferably less than 10 μm (diffractive relief structure). According to one aspect of the invention, the relief structure is a diffractive relief structure with a depth-to-width ratio of the individual structural elements of the relief structure in the range of between 0.5 and 10. The specific choice of the depth-to-width ratio in that case is dependent on the specific relief structure and the thin-film layer, substantially on the thickness of the spacer layer or layers producing the colour change, and can be determined experimentally or analytically, as is demonstrated by the following examples:

In order reliably to suppress the production of a colour shift effect by the thin-film layer, it is advantageous for the relief structures 25 and 26 not to be a simple grating in respect of which the depth of the relief structure is periodically varied only in one direction, but for the depth of the relief structure to be varied in two directions, for example in the direction of two different vectors which define the interfaces between the replication lacquer layer 22 and the thin-film layer 23. That also provides that the resulting effective surface area of the relief structures 25 and 26 is considerably increased in comparison with usual relief structures which are used for producing optical effects.

It has further been found that a considerable increase in the effective surface area of the relief structure and thus good results can also be achieved with linear gratings: the effective surface area S in a region R whose structural depth is determined by the function $z=f$ of $(x, y)$, can be described by the following equation:

$$S = \iint \Re\sqrt{1+f_x^2+f_y^2}\,dA$$

A cross-grating with a period d and a profile depth h can be described for example by the following function:

$$f(x, y) = h\sin^2\left(\frac{\pi x}{d}\right)\sin^2\left(\frac{\pi y}{d}\right)$$

If the periods x and y are identical, that results in the following partial differential quotients:

$$f_x = \frac{\partial}{\partial x}h\sin^2\left(\frac{\pi x}{d}\right)\sin^2\left(\frac{\pi y}{d}\right) = \frac{h\pi}{d}\sin\left(\frac{2\pi x}{d}\right)\sin^2\left(\frac{\pi y}{d}\right)$$

$$f_y = \frac{\partial}{\partial y}h\sin^2\left(\frac{\pi x}{d}\right)\sin^2\left(\frac{\pi y}{d}\right) = \frac{h\pi}{d}\sin^2\left(\frac{\pi x}{d}\right)\sin\left(\frac{2\pi y}{d}\right)$$

The effective surface area is thus determined by the following equation:

$$S = \iint_R \sqrt{1+f_x^2+f_y^2}\,dA$$

$$= \int_0^d \int_0^d \sqrt{1+\left(\frac{h\pi}{d}\right)^2\left[\left(\sin\left(\frac{2\pi x}{d}\right)\sin^2\left(\frac{\pi y}{d}\right)\right)^2 + \left(\sin^2\left(\frac{\pi x}{d}\right)\sin\left(\frac{2\pi y}{d}\right)\right)^2\right]}\,dx\,dy$$

That equation cannot be easily analytically solved. By a numerical solution to that equation however it was surprisingly found that the factor $\in$ which specifies the way in which the effective surface area changes in dependence on the depth-to-width ratio is significantly increased if the depth-to-width ratio h/d is >1.

By virtue of the relief structure, the thickness t in relation to the nominal thickness $t_0$ (thickness in "flat" regions), is influenced by the thickness ratio $\in$ or its inverse, the thickness reduction factor $1/\in$, as follows.

$$t = \frac{t_0}{\varepsilon}$$

Table 1 gives the numerical values for the depth-to-width ratio $0 < h/d \leq 5$ both for the thickness ratio $\in$ and also for the thickness reduction factor $1/\in$ of a cross-grating.

For example with h=2d, that is to say when the profile depth is twice the grating period, the effective surface area is enlarged by the factor $\in$=3.5. The effective thickness t is thus reduced by the thickness reduction factor $1/\in$=1/3.5 to about 28% of the nominal thickness $t_0$. In the case of a relief structure with a depth-to-width ratio of 2 the effective thickness of the thin-film layer is thus $t_0/\in$=0.3 $t_0$, that is to say in that region the thickness of the thin-film layer is only a third of the thickness of the thin-film layer in a flat region.

TABLE 1

| Depth-to-width ratio h/d | Thickness factors $\epsilon$ | Thickness reduction factor $1/\epsilon$ |
|---|---|---|
| 0 | 1.00 | 1.00 |
| 0.5 | 1.36 | 0.74 |
| 1.0 | 2.02 | 0.50 |
| 1.5 | 2.75 | 0.36 |

TABLE 1-continued

| Depth-to-width ratio h/d | Thickness factors ϵ | Thickness reduction factor 1/ϵ |
|---|---|---|
| 2.0 | 3.52 | 0.28 |
| 2.5 | 4.30 | 0.23 |
| 3.0 | 5.09 | 0.20 |
| 3.5 | 5.88 | 0.17 |
| 4.0 | 6.88 | 0.15 |
| 4.5 | 7.47 | 0.13 |
| 5.0 | 8.28 | 0.12 |

Figure 3:
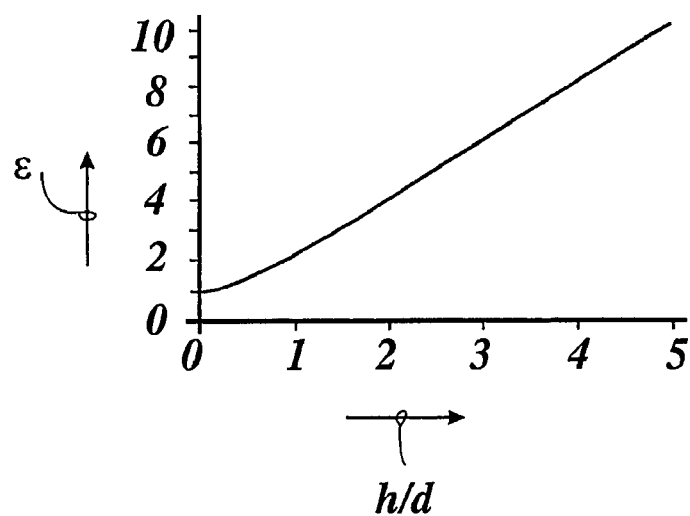
FIG. 3 shows a graph representation of the function $\in = f(h, d)$.

FIG. 3 shows the numerical values from Table 1 in the form of a graph and shows the dependency of the thickness ratio ∈ on the depth-to-width ratio h/d.

Figure 4:
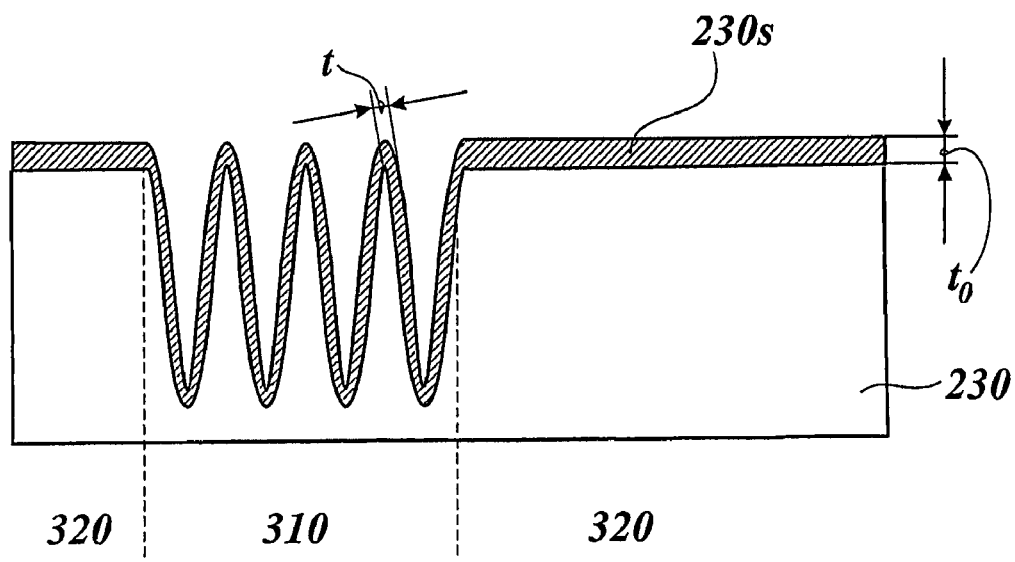
FIG. 4 shows a diagrammatic sectional view of a relief structure with a high depth-to-width ratio.

FIG. 4 now shows a diagrammatic sectional view illustrating a layer 230 with regions 310 and 320 with different relief structures which are provided with a thin-film layer 230s. The thin-film layer is of the nominal thickness $t_0$ in the flat regions 320 which have a smooth surface and it is of the smaller thickness t in the region 310 which has a high depth-to-width ratio.

FIGS. 5a to 5d are diagrammatic views showing the effect of the depth-to-width ratio on the effective local thickness t. The relief structure of the layer 230 is of a constant width d=350 nm, with a changing depth h. The thin-film layer 230s is of the nominal thickness $t_0$=40 nm.

In FIG. 5a the layer 230 is smooth The thin-film layer 230s is therefore of the maximum thickness, namely the nominal thickness $t_0$=40 nm.

FIG. 5b now shows the layer 230 with a relief structure whose depth h=100 nm. The depth-to-width ratio is h/d=0.29. This involves a relief structure with a low depth-to-width ratio. The thickness of the thin-film layer 230d, on the flanks of the relief structure, is only slightly less than the nominal thickness $t_0$.

FIG. 5c now shows the layer 230 with a relief structure whose depth h=400 nm, that is to say four times greater than the depth of the relief structure shown in FIG. 5b. The depth-to-width ratio is now h/d=1.14. The thickness of the thin-film layer 230d, on the flanks of the relief structure, is now substantially less than the nominal thickness $t_0$.

FIG. 5d shows the layer 230 with a relief structure whose depth h=800 nm. The depth-to-width ratio is therefore h/d=2.3. The thickness of the thin-film layer 230d, on the flanks of the relief structure, is reduced again in relation to the thickness of the relief structure shown in FIG. 5c.

Figure 6:
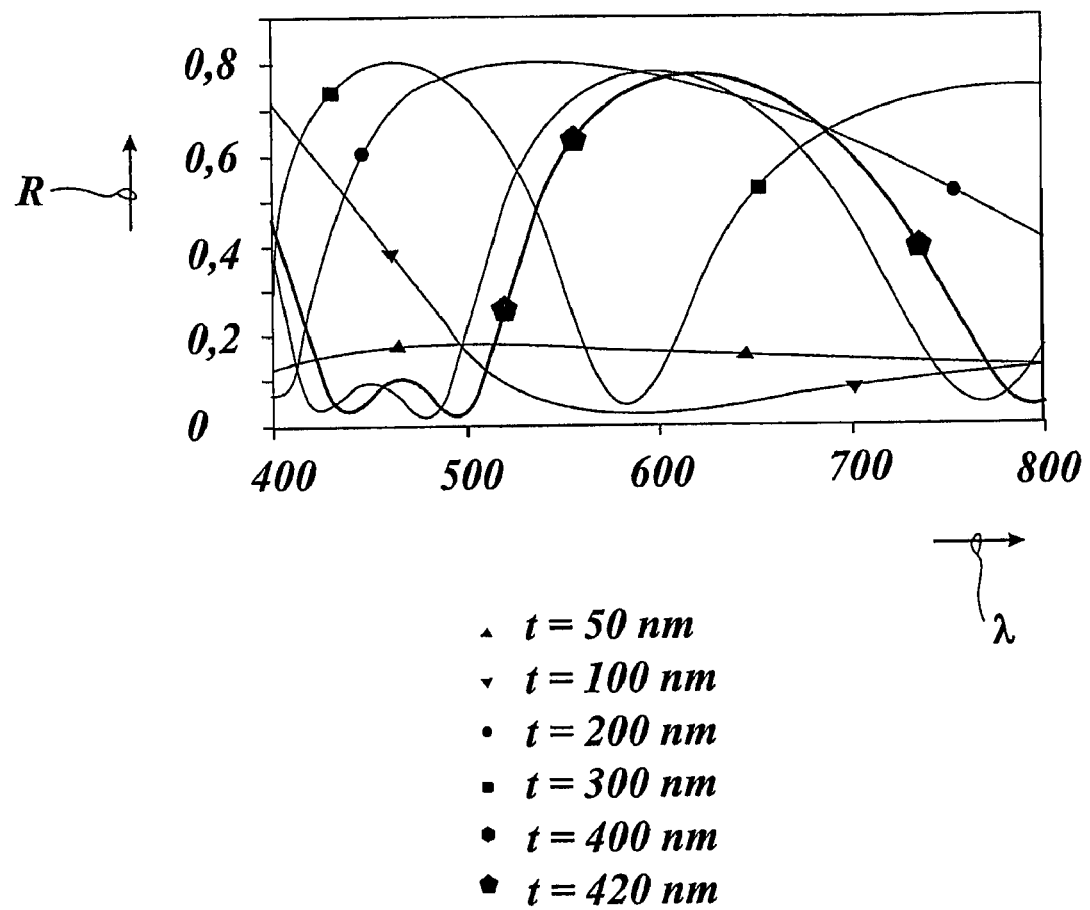
FIG. 6 shows a graph representation of the dependency of the degree of reflection of an embodiment of a thin-film layer on the wavelength of the incident light and the effective thickness.

FIG. 6 now shows a view in the form of a graph illustrating the dependency, ascertained with the computer program "Gsolver", of the reflection capability of a thin-film layer on the wavelength λ of the incident light and the effective thickness t.

The thin-film layer is in the form of a thin-film layer system with an $SiO_2$ layer of a thickness of 275 nm, which is arranged between two $TiO_2$ layers each of a thickness of 70 nm. In this case the $SiO_2$ layer forms the spacer layer which is responsible for the colour change and which satisfies the λ/2 or λ/4 condition for producing the interference effect. The nominal thickness $t_0$ of the thin-film layer is therefore $t_0$=(70+275+70) nm=415 nm. The thin-film layer is arranged on a plastic substrate which has a refractive index of 1.5 and adjoins air.

The plastic substrate has relief structures which provide for different effective thicknesses t for the thin-firm layer. As can be seen from FIG. 6 the reflected colours are correspondingly more shifted towards the colour blue, the thinner the respective thin-film layer is.

As can further be seen from FIG. 6 the thin-film layer appears for the major part to be transparent if the effective thickness t<100 nm.

That corresponds for a thin film with a colour shift effect at the lower end of the spectrum of visible light (red), with a thickness reduction factor 1/∈=t/$t_0$=100 nm/415 nm=0.24. By a comparison with foregoing Table 1 and FIG. 3, it follows therefrom that the depth-to-width ratio h/d must be >2.4 in order to achieve the thickness reduction factor ∈=4.15.

It can further be seen that the depth-to-width ratio can be smaller, for producing transparency, in comparison with red light, if the light involved is green or blue light. Furthermore the result is also dependent on the viewing angle. The depth-to-width ratio should thus be h/d>0.5 for a colour shift effect at the upper end of the spectrum of visible light. Since, as already set forth hereinbefore, a great reduction in the effective thickness of the thin film occurs from a depth-to-width ratio h/d≧1, the depth-to-width ratio is generally to be selected to be ≧1 in order to reliably suppress the colour change effect in the region of the relief structure.

Figure 7:
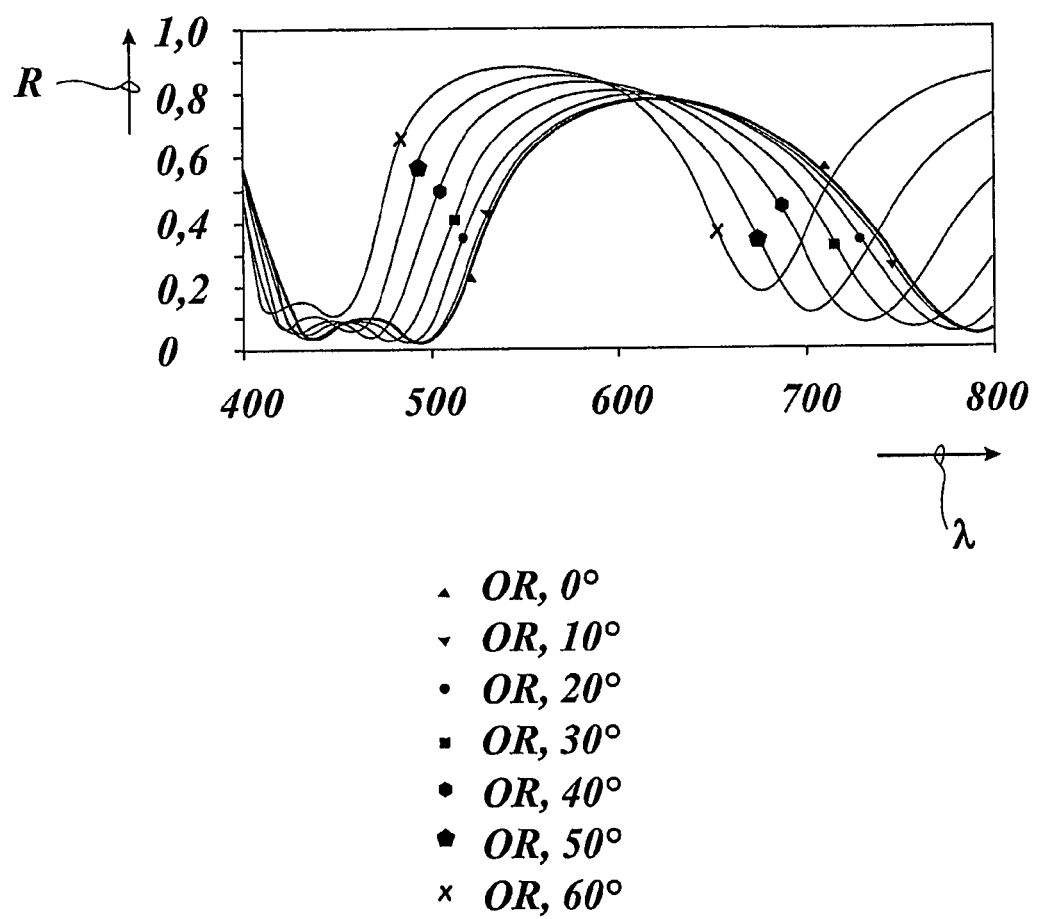
FIG. 7 shows a graph representation of the dependency of the degree of reflection of the thin-film layer in FIG. 6 in dependence on the wavelength and the angle of incidence of OR-polarised light, FIGS. 8a to 8c each show an image representation of a plan view onto a security element according to the invention.

FIG. 7 now shows a graph illustrating the dependency, calculated with the computer program "Gsolver", of the degree of reflection R on the wavelength and the angle of incidence of OR-polarised light. This is based on the thin-film layer described hereinbefore with reference to FIG. 6. It can be seen from FIG. 7 that, with an increasing angle of incidence of the light, a colour shift occurs in the degree of reflection in the direction of blue. It is to be assumed that in this case also the thin-film layer appears transparent at a depth-to-width ratio h/d>2.4—or even at a smaller depth-to-width ratio (see above).

A line grating of a period d and of a profile depth h can be described by the following equation:

$$f(x, y) = h\sin^2\left(\frac{\pi x}{d}\right)$$

That affords the following partial differential quotients:

$$f_x = \frac{\partial}{\partial x} h\sin^2\left(\frac{\pi x}{d}\right) = \frac{h\pi}{d}\sin\left(\frac{2\pi x}{d}\right)$$

$$f_y = \frac{\partial}{\partial y} h\sin^2\left(\frac{\pi x}{d}\right) = 0$$

The effective surface area can thus be described by the following equation:

$$S = \int\int_R \sqrt{1 + f_x^2 + f_y^2}\, dA$$

$$= \int_0^d \int_0^d \sqrt{1 + \left(\frac{h\pi}{d}\right)^2 \left[\left(\sin\left(\frac{2\pi x}{d}\right)\right)^2\right]}\, dxdy$$

$$= \frac{2d^2}{\pi} E\left(\frac{-h^2\pi^2}{d^2}\right)$$

In that case E (α) represents the whole elliptical second-order integral.

In this case also numerical solutions to that equation have surprisingly shown that the factor ∈ is significantly increased if the depth-to-width ratio h/d>1. Surprisingly it has also been found that the increase in the factor ∈ in the case of a line grating is greater than in the case of the above-considered cross-grating with the same depth-to-width ratio.

By way of example, with a depth-to-width ratio h=2d that gives a factor ∈=4.2 which is greater than the value for the cross-grating considered hereinbefore.

The foregoing considerations correspondingly apply in terms of the adoption of the depth-to-width ratio for suppressing the colour shift effect.

The described effect of transparency of the thin-film layer in regions with a high depth-to-width ratio is not limited to the above-described configuration of the thin-film layer. In a second embodiment of a thin-film layer, this can involve a thin-film layer which comprises a $TiO_2$ layer (spacer layer) of a thickness of 275 nm and which is arranged between two plastic layers which for example have a refractive index of 1.5. In a third embodiment this can involve three layers which are arranged between two plastic layers, more specifically a Cr layer of a thickness of 8 nm, an $MgF_2$ layer of a thickness of 215 nm and an Al layer of a thickness of 50 nm.

It is preferably provided that the relief structures are relief structures whose period d, that is to say the spacing thereof between two raised portions, is selected as d<λ or still more preferably as d<λ/2, wherein λ is preferably the wavelength of the colour effect which occurs when viewed perpendicularly. It is possible in that way to ensure that no diffraction effects which influence the image for the human viewer occur in the region of the relief structure. The range of visible light is between 450 nm and 670 nm. Therefore d should be <555 nm for the wavelength λ=555 nm to which the human eye is at its most sensitive. Investigations have shown that troublesome diffraction effects can be substantially prevented if d<450 nm, and is preferably in the range of 300 nm-350 nm.

Figure 9:
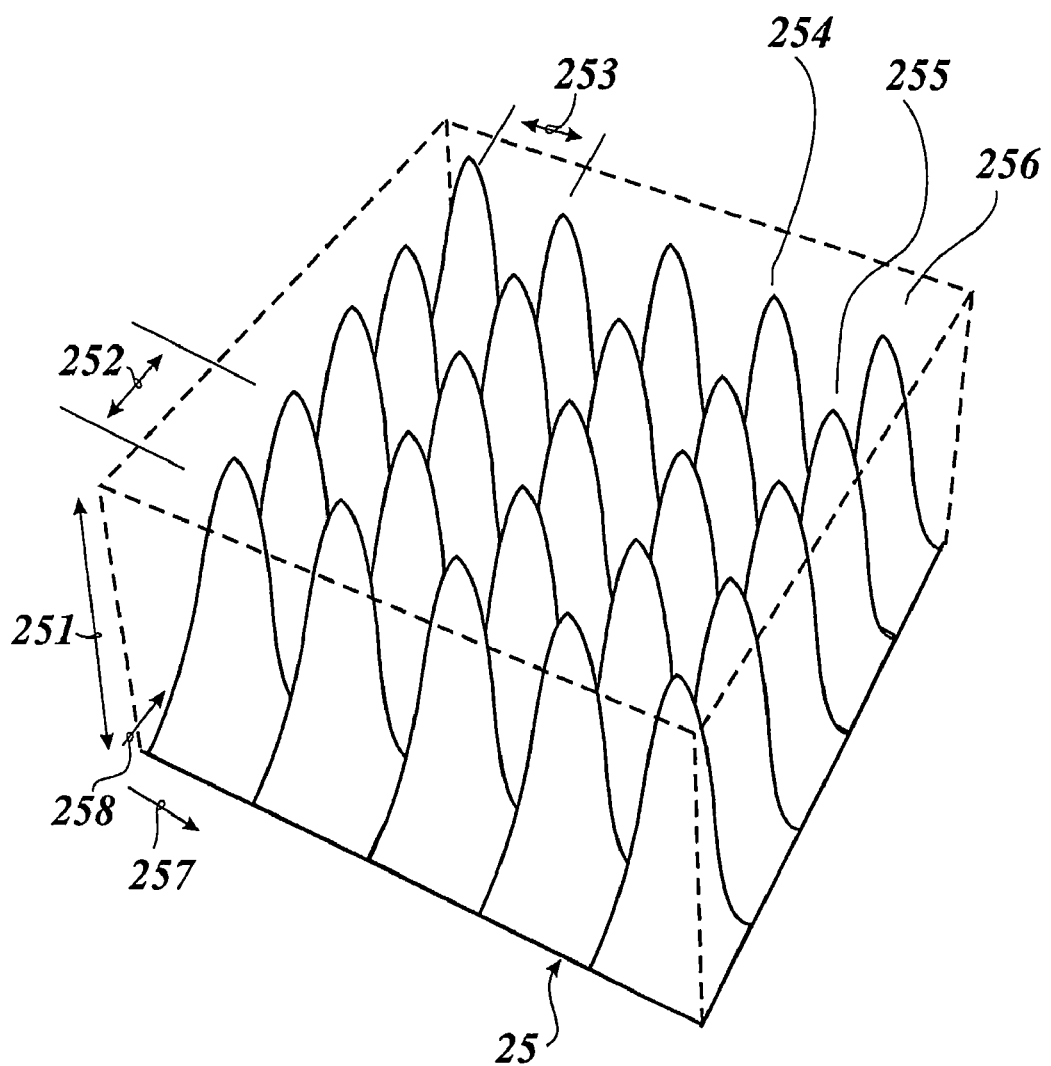
FIG. 9 shows a diagrammatic view of a relief structure for use in a security element according to the invention.

FIG. 9 now shows a diagrammatic view of a part of a relief structure which can be used for the relief structure 25 and which is adapted to suppress the production of a colour shift effect by the thin-film layer 23.

As shown in FIG. 9, the relief structure 25 is a periodic function f (x, y), wherein two arrows 257 and 258 in FIG. 4 represent the associated co-ordinate axes. The function f (x, y) varies the depth of the relief structure 25 periodically, for example sinusoidally, both in the x-direction and also in the y-direction. That affords the relief profile shown in FIG. 4 with a plurality of raised portions, for example the raised portions 254, 255 and 256, which are each spaced from each other by a period length of the function f (x, y), for example a period length 253 from each other in the x-direction and a period length 252 from each other in the y-direction. In that respect the period lengths 252 and 253 are so selected that they are smaller than or equal to the structural depth of the relief structure 25, more specifically smaller than a structural depth 251.

The relief structure 25 shown in FIG. 9 thus has for example period lengths 252 and 253 of 330 nm and a structural depth of more than 500 nm.

It is also possible in that respect for both the profile shape, the period lengths 252 and 253 and the profile depth 251 to be of a different configuration from the view shown in FIG. 9. It is essential in that respect that at least one of the period lengths 252 and 253 are smaller than or equal to the structural depth 251 and that the period lengths 252 and 253 are spaced from each other at less than 200 μm (resolution limit of the human eye). Particularly good results are achieved if at least one of the period lengths 252 and 253 is less than the limit wavelength of visible light.

It is also possible for suppression of the production of a colour shift effect by the thin-film layer to be achieved by means of relief structures which have a complex surface profile with raised portions and recesses of differing height. Surface profiles of that kind may also involve stochastic surface profiles. With such surface profiles, suppression of the colour shift effect is generally achieved if the mean spacing of adjacent raised portions of the relief structure is less than the mean profile depth of the relief structure and adjacent raised portions of the relief structure are spaced from each other at less than 200 μm. If the colour shift effect generated by the thin-film layer is in the region of green or blue, then suppression of the effect—as already shown hereinbefore in relation to periodic structures—can generally be achieved by a mean depth-to-width ratio which is greater than 0.5. Preferably in that respect the mean spacing of adjacent raised portions is selected to be less than 30 μm so that the relief structure is a special diffractive relief structure.

It is further advantageous to use combination structures like a combination structure consisting of a microstructure and a macrostructure, in respect of which a coarse deep first structure is superimposed by a fine high-frequency second structure. Examples of combination structures of that kind are a coarse asymmetrical structure with a fine sine grating or a coarse triangular structure with a fine sine grating. It has been found that the above-described demands for achieving good suppression of the colour shift effect can be achieved more easily by means of such a combination structure.

The thin-film layer 23 is distinguished in principle by an interference layer structure which produces viewing angle-dependent colour shifts. In that respect the thin-film layer 23 can be in the form of a reflective element or a transmissive element. More detailed information relating to thin-film layer systems which can be used for the thin-film layer 23 are to be found for example in Chapter 13 of the book "Optical document security", R. L. van Renesse, ed., Artech House, London, by J. A. Dobrowolski. The following options in principle are available in that respect for the construction of the thin-film layer 23.

The thin-film layer thus has for example an absorption layer (preferably with between 30% and 65% transmission), a transparent spacer layer as a colour change-producing layer (λ/2 or λ/4 layer), a metal layer as a reflecting layer (reflective element) or an optical separation layer (transmissive element). In that respect it is also possible for the adhesive layer 24 to act as an optical separation layer if the refractive index thereof differs markedly from that of the spacer layer. If the thin-film layer 23 acts as a reflective element then the thickness of the spacer layer is to be so selected that the λ/4 condition is satisfied. If the thin-film layer 23 acts as a transmissive layer the spacer layer has to satisfy the λ/2 condition.

A thin-film layer of that kind is formed for example by a thin-film layer system made up from one or more dielectric and metallic layers. By way of example the thin-film layer 23 thus comprises a chromium layer of a thickness of 8 nm an $MgF_2$ layer of a thickness of 215 nm and an Al layer of a thickness of 50 nm.

In addition it is also possible for the thin-film layer 23 to be made up from a succession of high-refractive and low-refractive layers. A thin-film layer of that kind comprises for example a plurality of successive dielectric layers of different refractive indices. By way of example the thin-film layer 23 comprises a $TiO_2$ layer of a thickness of 70 nm, an $SiO_2$ layer of a thickness of 275 nm as a colour change-producing spacer layer and a $TiO_2$ layer of 70 nm. A thin-film layer of that kind comprises a succession of between three and nine such layers (odd number) or a number of between two and ten such layers (even number). The greater the number of layers, the correspondingly sharper is it possible to set the wavelength for the colour change.

In addition it is also possible for the thin-film layer 23 to comprise a single layer of a metal oxide with a high refractive index, for example a $TiO_2$ layer of a thickness of 275 nm. Thin-film layers of that kind are also referred to as pearlescence layers. In that case the thickness of the thin-film layer has to satisfy the $\lambda/4$ or $\lambda/2$ condition (depending on whether it involves a reflective or a transmissive element).

Preferably the layers of the thin-film layer 23 are applied over the full surface area involved to the replication lacquer 22 by means of sputtering. Depending on whether the thin-film layer 23 can involve a reflective element or a transmissive element, the thin-film layer 23 in that case includes a reflection layer which is preferably made up of a thin metallic layer, for example of Al, Ag, Cr, Ni, Cu, Au or a combination of those metals.

The adhesive layer 24 is then applied to the thin-film layer 23. The adhesive layer 24 is preferably a layer of thermally activatable adhesive. Depending on the respective use of the security element 11 however it is also possible to dispense with the adhesive layer 24.

In this case the relief structures 25 and 26 are shaped in regions 31 and 33 of the security element 11. The regions 31 and 33 are surrounded by regions 32 in which no relief structures are shaped in the replication lacquer layer 22 so that, in those regions, the replication lacquer layer 22 has a substantially flat surface.

Figure 8A:
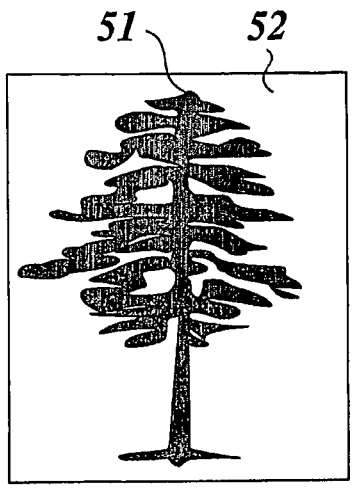
Figure 8B:
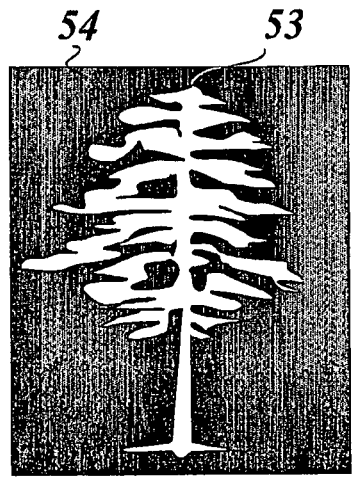
Figure 8C:
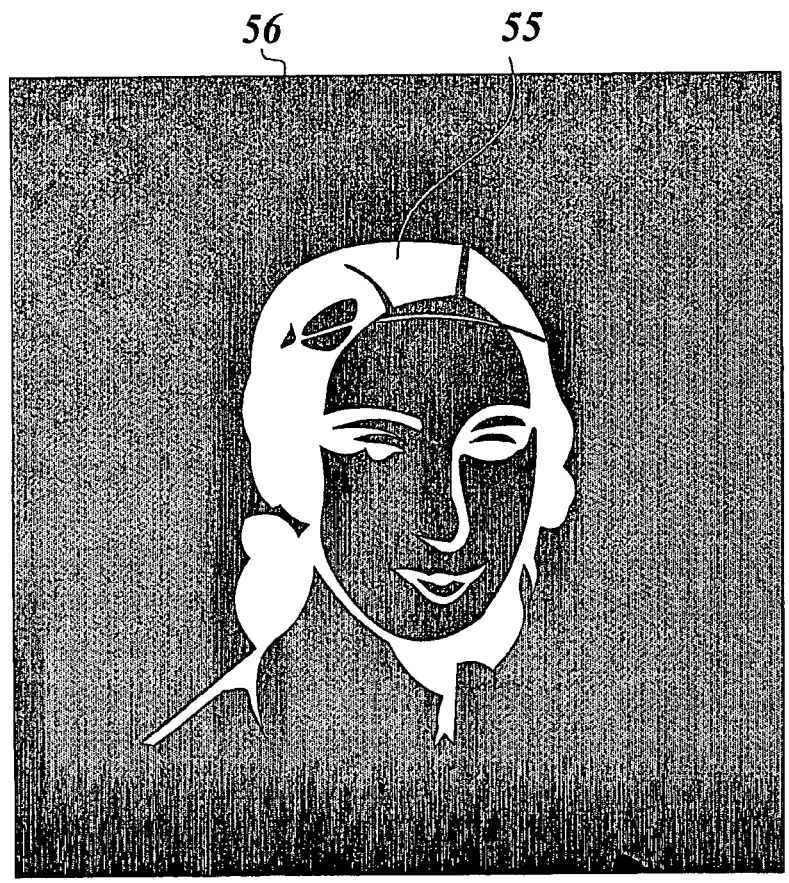

Depending on whether the regions 31 and 33 are formed as pattern regions or as background regions for a pattern which is in the foreground, the effects shown by way of example in FIGS. 8a to 8c thus occur upon being viewed:

FIG. 8a shows a pattern region 51 which is in the form of a tree and a background region 52 which surrounds the pattern region 51. The background region 52 is occupied with the relief structure 25 so that the production of a colour shift effect by the thin-film layer 23 is suppressed in the background region 52. No relief structure 25 is provided in the pattern region 51 so that the colour shift effect produced by the thin-film layer 23 is visible in that region. That therefore affords the representation of a tree, the colour of which changes from a red colouration to a green colouration in dependence on the viewing direction, against a background which presents no colour shift effects.

FIG. 8b shows a pattern region 53 in the form of a tree against a background region 54, wherein the relief structure 25 is formed in the pattern region 53 and no relief structure is formed in the background region 54. The person viewing it thus has the impression of a (translucent) tree, the background of which changes its colour depending on the respective direction of the angle of view.

FIG. 8c shows a representation of Clara Schumann 55 against a background region 56. In this case too the relief structure 25 is arranged in the pattern region forming the representation of Clara Schumann so that the representation of Clara Schumann results from the contrast of the background region 56 which is the subject of a colour change and the transparent line configuration of the pattern region.

Figure 2:
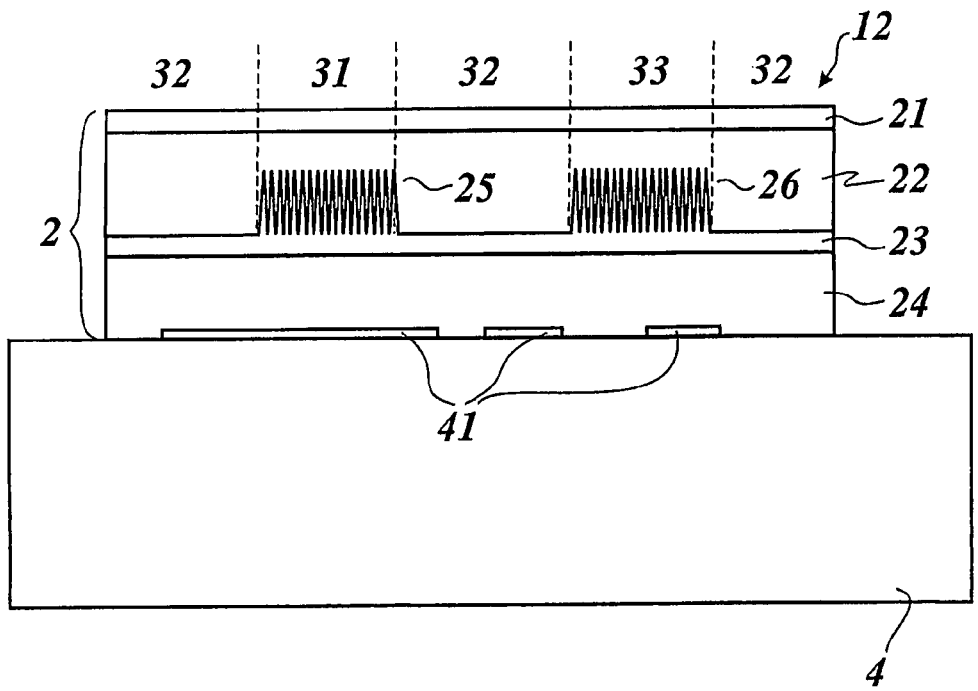
FIG. 2 shows a diagrammatic view of a security document with a security element according to the invention.

FIG. 2 shows a preferred use of the stamping film shown in FIG. 1.

FIG. 2 thus shows the transfer layer 2 of a transfer film which is applied to a document 4 to be safeguarded. In this case the transfer layer 2 forms a security element 12 which is made up of the protective lacquer layer 21, the replication lacquer layer 22, the thin-film layer 23 and the adhesive layer 24. The relief structures 25 and 26 are shaped into the replication lacquer layer 22 in the regions 31 and 33. In the region 32 surrounding them, no relief structure is shaped into the interface layer between the replication lacquer layer 22 and the thin-film layer 23 so that here the interface layer is substantially flat. In regard to the configuration of the layers 21, 22, 23 and 24 and the configuration of the relief structures 25 and 26, attention is directed to the description relating to FIG. 1 and FIG. 9.

For personalisation purposes an individualised print 41 is applied for example by means of a thermal transfer process to the document 4 which for example is an identity card document. The transfer layer 2 is then applied to the document 4 in such a way that the security element 12 covers over the individualised print 41. In this embodiment the thin-film layer 23 is in the form of a transmissive element so that the individualised print 41 is perceptible to the viewer through the thin-film layer 23 and the individualised print 41 is superimposed in the regions 32 by the viewing angle-dependent colour shift effect generated by the thin-film layer 23.

Figure 10:
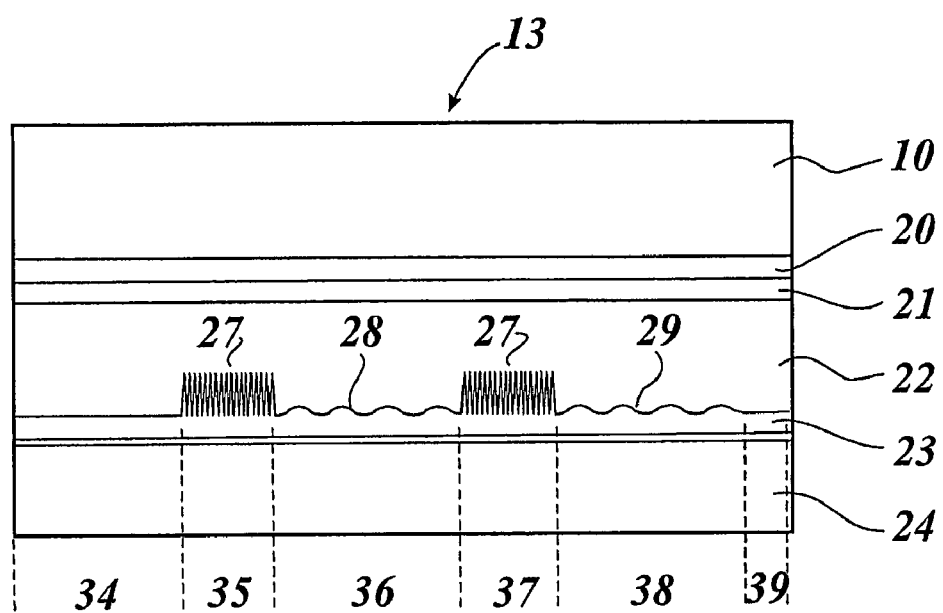
FIG. 10 shows a diagrammatic view of a security element according to the invention for a further embodiment of the invention.

FIG. 10 shows a further embodiment of a security element 13 according to the invention.

The security element 13 is a transfer film which is formed by a multi-layer film body with the carrier layer 10, the release layer 20, the protective lacquer layer 21, the replication lacquer layer 22, the thin-film layer 23 and the adhesive layer 24. The layers 10 to 24 are of a configuration corresponding to the layers identified in the same fashion in FIG. 1. A relief structure is shaped into the interface between the replication lacquer layer 22 and the thin-film layer 23 in the regions 35 and 37, that relief structure being of a configuration corresponding to the relief structures 25 and 26 shown in FIG. 1 and FIG. 9. Relief structures 28 and 29 are shaped into the interfaces in the regions 28 and 29 of the security element 13. No relief structures are shaped into the interface in regions 34 and 39 of the security element 13 so that in those regions the interface is substantially flat.

The relief structures 28 and 29 are relief structures which generate an optical effect which is superimposed with the optical effect generated by the thin-film layer 23.

Thus the relief structure 28 is for example an optical-diffraction structure, for example a dot matrix hologram, a KINEGRAM® or a usual diffraction grating.

The relief structure 29 is for example a macrostructure, for example a structure with an extreme value spacing of more than 30 μm. In addition the relief structure 29 can also be a microlens structure or a matt structure, for example an anisotropic matt structure with a directed scatter characteristic.

In this case the relief structures 28 and 29 are preferably so selected that the spacing between raised portions of those relief structures is greater than the structural depth of the relief structures. That substantially avoids attenuation of the optical-diffraction effect produced by the thin-film layer 23, by the superimposing relief structures 28 and 29.

Figure 11A:
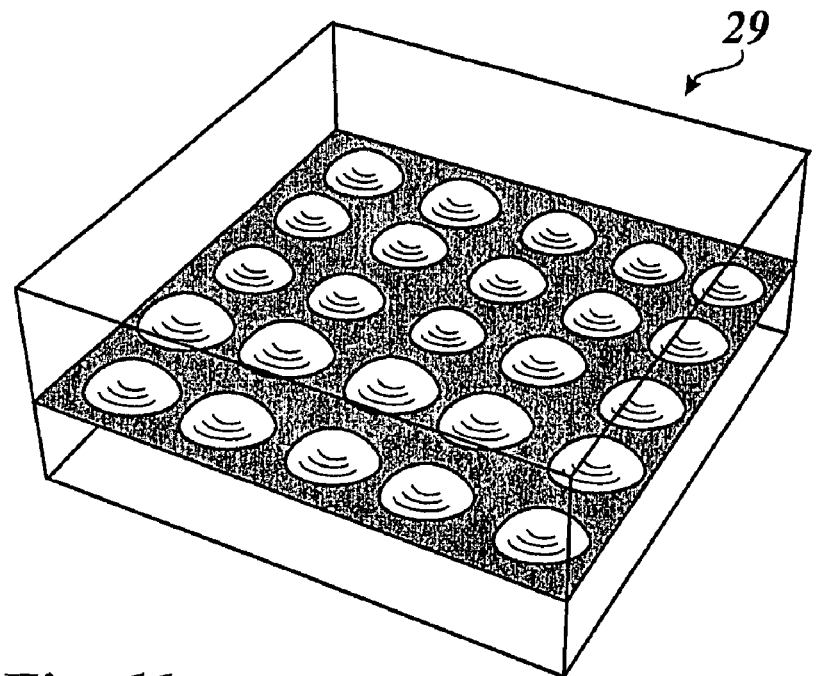
FIGS. 11a and 11b show diagrammatic views of relief structures which are used in the security element of FIG. 10.
Figure 11B:
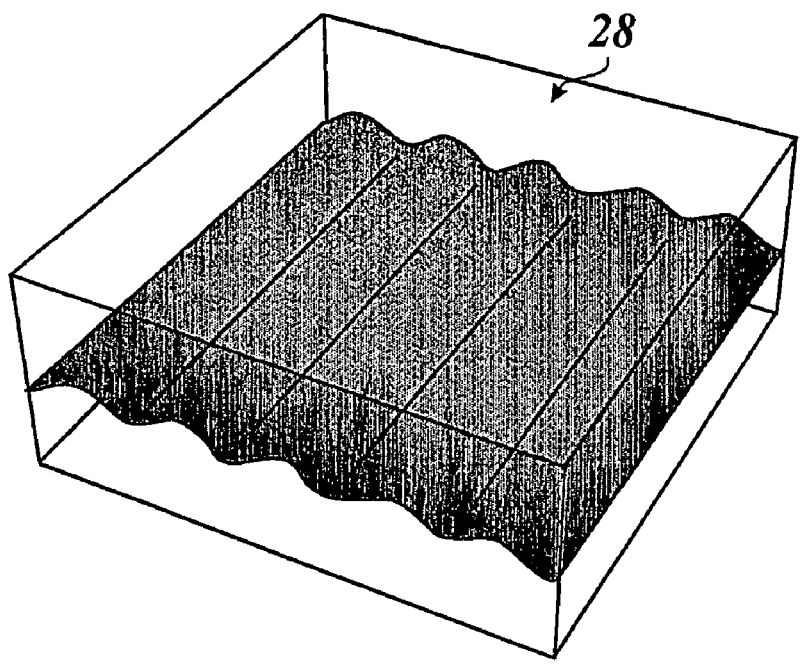

FIGS. 11a and 11b show by way of example diagrammatic views of a portion of the relief structures 28 (FIG. 11b) and 29 (FIG. 11a).

It is pointed out in that respect that FIG. 1, FIG. 2, FIG. 9, FIG. 10, FIG. 11a and FIG. 11b are diagrammatic views in which the size dimensions and the ratio of the size dimensions do not correspond to the actual values.

The configuration of the security element shown in FIG. 10 provides that a superimposition of the optical effects produced by the thin-film layer 23 and the relief structure 28 is perceptible to the viewer in the region 36. In the regions 35 and 37 surrounding the region 36, the optical effect produced by the thin-film layer 23 is suppressed by the relief structure 27 so that an optically variable security element is not recognisable for the viewer in that region. The result of this is that the region 36 in which the two optical effects are superimposed is precisely and sharply delimited in relation to the surrounding regions 35 and 37 in which no optically variable security element can be recognised. With a suitable configuration in respect of the security feature produced by the relief structure 28, just minor deviations in the mutually superimposed security features are clearly recognisable so that copying by means of other technologies which do not afford that high level of register accuracy is immediately recognisable.

In addition, the viewing angle-dependent colour shift effect produced by the thin-film layer 23 can be seen by the viewer in the regions 34 and 39. In the region 39 the viewer sees an optical effect which arises out of the superimposition of the viewing angle-dependent colour shift effect of the thin-film layer 23 and the optical effect generated by the relief structure 29. That therefore gives a respective different viewing impression for the viewer in each of the regions 34, 35, 36, 37, 38 and 39.

Furthermore it is also possible for a metal layer which is partially shaped out to be arranged between the replication lacquer layer 22 and the thin-film layer 23. That partial metal layer is used to provide regions in which the optical effect produced by the relief structures 28 and 29 is to be recognisable decoupled from the optical effect generated by the thin-film layer 23. Thus the partial metal layer for example covers subregions of the region 36 and/or of the region 38. Furthermore it is also possible for the partial metal layer to be provided in (sub)regions 34 and 39 and thus to provide partial reflective surfaces as further security features of the security element 13.

The invention claimed is:

1. A security element in the form of a multi-layer film body, comprising:
    a replication lacquer layer having a first relief structure shaped into a surface thereof, the first relief structure defining a first region of the replication lacquer layer in which the first relief structure is formed and defining a second region of the replication lacquer layer in which the first relief structure is not formed; and
    a thin-film layer which is applied to the replication lacquer layer as an interference layer and extends continuously across the first and second regions thereof, wherein across the second region the thin-film layer has a nominal thickness $t_0$ and producing a viewing angle-dependent first color shift effect by interference, the thin-film layer having a reduced thickness t across the first region, the reduced thickness t causing no color shift effect to be produced from the thin-film layer in the first region, the reduced thickness t being less than the nominal thickness $t_0$.

2. A security element according to claim 1, wherein the first relief structure is a structure with a mean depth-to-width ratio of individual structural elements of greater than 0.5.

3. A security element according to claim 1, wherein the first relief structure is formed in a plane defined by co-ordinate axes x and y, the depth of the first relief structure varies both in the x-direction and also in the y-direction, that the mean spacing of adjacent raised portions of the first relief structure is less than the mean profile depth of the relief structure and that adjacent raised portions of the relief structure are remote from each other at less than 200 μm.

4. A security element according to claim 1, wherein the mean spacing of adjacent raised portions or at least one of the period lengths is shorter than 400 nm.

5. A security element according to claim 1, wherein the mean spacing of adjacent raised portions of the first relief structure is less than the limit wavelength of visible light, preferably less than half the limit wavelength of visible light.

6. A security element according to claim 1, wherein a second relief structure is formed in the interface in the second region, wherein an optical effect generated by the second relief structure is superimposed with the first color shift effect generated by the thin-film layer-interference layer structure.

7. A security element according to claim 1, wherein the first and second regions directly adjoin each other.

8. A security element according to claim 1, wherein the thin-film layer is a transmissive thin-film layer-interference layer structure.

9. A security element according to claim 1, wherein the thin-film layer is a reflective thin-film layer-interference layer structure.

10. A security element according to claim 1, wherein a reflection layer is partially arranged between the replication lacquer layer and the thin-film layer.

11. A security element according to claim 1, wherein a reflection layer is partially arranged between the replication lacquer layer and the thin-film layer.

12. A security element in the form of a multi-layer film body, comprising:
    a replication lacquer layer having a first relief structure shaped into a surface thereof, the first relief structure defining a first region of the replication lacquer layer in which the first relief structure is formed and defining a second region of the replication lacquer layer in which the first relief structure is not formed; and
    a thin-film layer which is applied to the replication lacquer layer as an interference layer and extends continuously across the first and second regions thereof, wherein across the second region the thin-film layer has a nominal thickness $t_0$ and producing a viewing angle-dependent first color shift effect by interference, the thin-film layer having a reduced thickness t across the first region, the reduced thickness t causing the viewing angle dependent first color shift effect not to be produced from the thin-film layer in the first region, the reduced thickness t being less than the nominal thickness $t_0$, wherein a depth-to-width ratio of the first relief structure is selected to be so great that the effective thickness of a color change-producing portion is so greatly reduced by the first relief structure in the region of the first relief structure that the thin-film layer no longer satisfies the λ/2 or λ/4 condition for the range of visible light, λ being the wavelength of the color shift effect which occurs when viewed perpendicular to the surface of the replication lacquer layer.

13. A security element according to claim 12, wherein the first relief structure is a structure with a mean depth-to-width ratio of individual structural elements of greater than 0.5.

14. A security element according to claim 12, wherein the first relief structure is formed in a plane defined by co-ordinate axes x and y, the depth of the first relief structure varies both in the x-direction and also in the y-direction, that the mean spacing of adjacent raised portions of the first relief structure is less than the mean profile depth of the relief structure and that adjacent raised portions of the relief structure are remote from each other at less than 200 μm.

15. A security element according to claim 12, wherein the mean spacing of adjacent raised portions or at least one of the period lengths is shorter than 400 nm.

16. A security element according to claim 12, wherein the mean spacing of adjacent raised portions of the first relief structure is less than the limit wavelength of visible light, preferably less than half the limit wavelength of visible light.

17. A security element according to claim 12, wherein a second relief structure is formed in the interface in the second region, wherein an optical effect generated by the second relief structure is superimposed with the first color shift effect generated by the thin-film layer-interference layer structure.

18. A security element according to claim 12, wherein the first and second regions directly adjoin each other.

19. A security element according to claim 12, wherein the thin-film layer is a transmissive thin-film layer-interference layer structure.

20. A security element according to claim 12, wherein the thin-film layer is a reflective thin-film layer-interference layer structure.

* * * * *